United States Patent
Wetzel et al.

(10) Patent No.: US 6,999,093 B1
(45) Date of Patent: Feb. 14, 2006

(54) DYNAMIC TIME-OF-DAY SKY BOX LIGHTING

(75) Inventors: Mikey S. Wetzel, Redmond, WA (US); David Scott McCoy, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 434 days.

(21) Appl. No.: 10/338,940

(22) Filed: Jan. 8, 2003

(51) Int. Cl.
G06T 17/00 (2006.01)
G09G 5/00 (2006.01)
H04N 9/66 (2006.01)
H04N 9/65 (2006.01)
H04N 9/74 (2006.01)

(52) U.S. Cl. .............. 345/581; 345/428; 345/582; 345/586; 345/589; 345/630; 345/633; 348/586; 348/638; 348/642

(58) Field of Classification Search ........... 345/473, 345/474, 629–630, 633–634, 636, 638, 589, 345/586, 596–597, 601–602, 643, 581–583, 345/418–428, 587; 348/553, 557, 563–566, 348/577–578, 584, 586, 599, 638, 642, 136, 348/671, 708, 624; 382/162–167, 169, 171, 382/172–173, 103; 463/31–36
See application file for complete search history.

(56) References Cited

U.S. PATENT DOCUMENTS

| | | | | |
|---|---|---|---|---|
| 5,714,997 A | * | 2/1998 | Anderson | 348/39 |
| 6,577,351 B1 | * | 6/2003 | Yu et al. | 348/624 |
| 6,634,947 B1 | * | 10/2003 | Miyamoto et al. | 463/36 |
| 6,661,918 B1 | * | 12/2003 | Gordon et al. | 382/173 |
| 2003/0194110 A1 | * | 10/2003 | Brodsky | 382/103 |
| 2004/0080507 A1 | * | 4/2004 | Von Prittwitz | 345/419 |

* cited by examiner

Primary Examiner—Matthew C. Bella
Assistant Examiner—Wesner Sajous
(74) Attorney, Agent, or Firm—Ronald M. Anderson

(57) ABSTRACT

A background (sky box) in a video game or other virtual reality environment dynamically changes as a function of a parameter, producing a more realistic display. Luminance-only texture and color texture data are employed to create the background. The color texture data are provided as a lookup table in which one axis of the lookup table corresponds to time or another variable, and the other axis indicates the colors of pixels in the display as a function of the altitude or azimuth of the pixels. The luminance-only texture data are thus modulated by the chrominance values from the color texture data for pixels in the background. Optionally, one of a plurality of two-dimensional color textures can be selected as a function of the variable and applied to the luminance-only texture data.

21 Claims, 9 Drawing Sheets (4 of 9 Drawing Sheet(s) Filed in Color)

GRAY SCALE TEXTURE DATA

APPLICATION OF COLOR TEXTURE DATA AT TIME "T" TO GRAY SCALE TEXTURE DATA

DYNAMIC TIME-OF-DAY SKY BOX LIGHTING

FIELD OF THE INVENTION

The present invention generally relates to background lighting for use in graphically rendering a virtual environment, and more specifically, to dynamically varying the lighting on the background in a video game or virtual environment as a function of time or of some other specified variable.

BACKGROUND OF THE INVENTION

Video games and virtual environments in which sky, mountains, and other objects in the general background of a scene must be portrayed are typically represented with geometry and textures that are static and unchanging and thus often appear flat and unimpressive. The background of a virtual environment is often referred to as a "sky box," because it usually includes at least some portion of the sky and in three dimensions, surrounds a virtual viewpoint like a cube or box. Objects such as clouds may be scrolled across the background to provide some improvement in realism, but the result can still appear very unrealistic. For example, if the virtual reality is supposed to represent the environment over a period of time during the day, an observer in the virtual environment would expect the lighting to change in a realistic manner corresponding to that period of time. For example, there should be a sunrise in the morning, which might appear as a yellow band along the horizon, with red mid bands, fading through a gradient into a dark blue sky above and gray to black in the foreground. At midday, the sky might appear a light blue color with darker blue above, and as evening approaches, the sunset might be represented as a band of reddish orange fading into dark blue above. Furthermore, the transition between these lighting conditions should change dynamically as time passes during the day. Since time can be compressed in a video game or virtual environment, the change in lighting conditions in a sky box will typically be readily apparent to a viewer, so that the added realism can provide a much more satisfying experience than the typical static lighting background provided in most games or virtual environment.

Currently, to achieve different light effects in a sky box, it is necessary to provide a bit map of the background for each different lighting condition, which can quickly increase the amount of storage for the game files required on a user's hard drive. Also, if only two or three different bit maps are used, rendering each new bitmap does not provide a gradually changing lighting in the sky box, since as each bit map is rendered, there is a sudden change in the appearance of the background as the lighting conditions and colors in one bitmap replace those of another. Such a sudden change in the lighting will appear unrealistic. Alternatively, one bit map can be made to "cross fade" into another, but the result is again not very realistic, unless the changes between successive bit maps is made relatively slight, so that the transitions are not apparent. However, as the number of bitmaps used increases, the requirements for storage space for the bitmap files also increases. In consideration of these problems, it will be apparent that there is a need for a more efficient and more realistic method of providing sky box lighting that changes dynamically. It should not be necessary to provide different bitmaps of the background for each different time of day that will be displayed. The approach employed should also be applicable to display backgrounds that are dynamically varying in response to parameters other than time.

SUMMARY OF THE INVENTION

One aspect of the present invention is directed to a method for displaying a background in a virtual environment so that the background varies dynamically. The virtual environment might be an electronic game or other form of a virtual or imaginary display in which sky box lighting is typically used. The program that implements the virtual reality will include geometry data that define the background, gray scale texture data for the background (i.e., luminance-only texture data), and color texture data for the background. The color texture data include chrominance values for the background that vary as a function of time (or as a function of another parameter) in the virtual environment. As time (or the value of the other parameter) changes in the virtual environment, appropriate corresponding chrominance values are loaded from the color texture data for pixels comprising the background or sky box. The gray scale texture data is then multiplied by the chrominance values for the pixels in the background to render the background of the virtual environment on a display. As time (or another selected parameter) changes, the background in the virtual environment dynamically changes in a generally realistic manner.

When time is the parameter that determines the dynamically changing background lighting, the color texture data preferably comprise a color texture lookup table having a first axis that varies with the passing of time in the virtual environment, and a second axis that is orthogonal to the first axis and along which the chrominance values define the color of pixels in either successive rows or columns of the background.

Since the game or other application using the present invention may only be displaying a portion of the background, the method further includes the step of determining the portion of the background being viewed, so that the portion is rendered for viewing.

To provide the gray scale texture data, it is preferable to simply strip out chrominance components from an image depicting the background. The chrominance values that vary with the parameter can either be manually created or created with the aid of an appropriate graphic tool or application program.

In one embodiment, the color texture data are provided as a plurality of two-dimensional (2D) color texture lookup tables, each corresponding to a different value of time or another parameter. The chrominance values defined along one axis of each of the color texture lookup tables is applied to corresponding pixels in the gray scale texture data as a function of a disposition of the pixels within the virtual environment, e.g., relative to the azimuth in the display, so that the chrominance values applied to each pixel are determined as a function of three-dimensional (3D) coordinates associated with each pixel. The 3D coordinates include a value for the predefined parameter used to determine the specific color texture lookup table that will be used, and coordinates for the disposition of the pixel relative to orthogonal axes in the gray scale texture data and in the color texture lookup table that is currently being used. In this embodiment, the color texture data are not necessarily uniform as the colors extend around the background, but can instead include corresponding areas of the background that differ between the various color texture lookup tables. For example, the sun can be shown in different positions at different times during the day, by depicting the sun in the color texture lookup tables at the different positions.

Another aspect of the present invention is directed to a memory medium having machine instructions stored thereon for carrying out the steps of the method noted above. Yet another aspect of the present invention is directed to a system for providing a background for a virtual environment, where the background is dynamically varied as a function of a predefined parameter. The system includes a display, and a memory stores a plurality of machine instructions, gray scale texture data for the background, and color texture data for the background. The machine instructions are executed by a processor, causing it to carry out steps that are generally consistent with the steps of the method discussed above.

BRIEF DESCRIPTION OF THE DRAWING FIGURES

The file of this patent contains at least one drawing executed in color. Copies of this patent with color drawings will be provided by the Patent and Trademark Office upon request and payment of the necessary fee.

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing Environment

Figure 1:
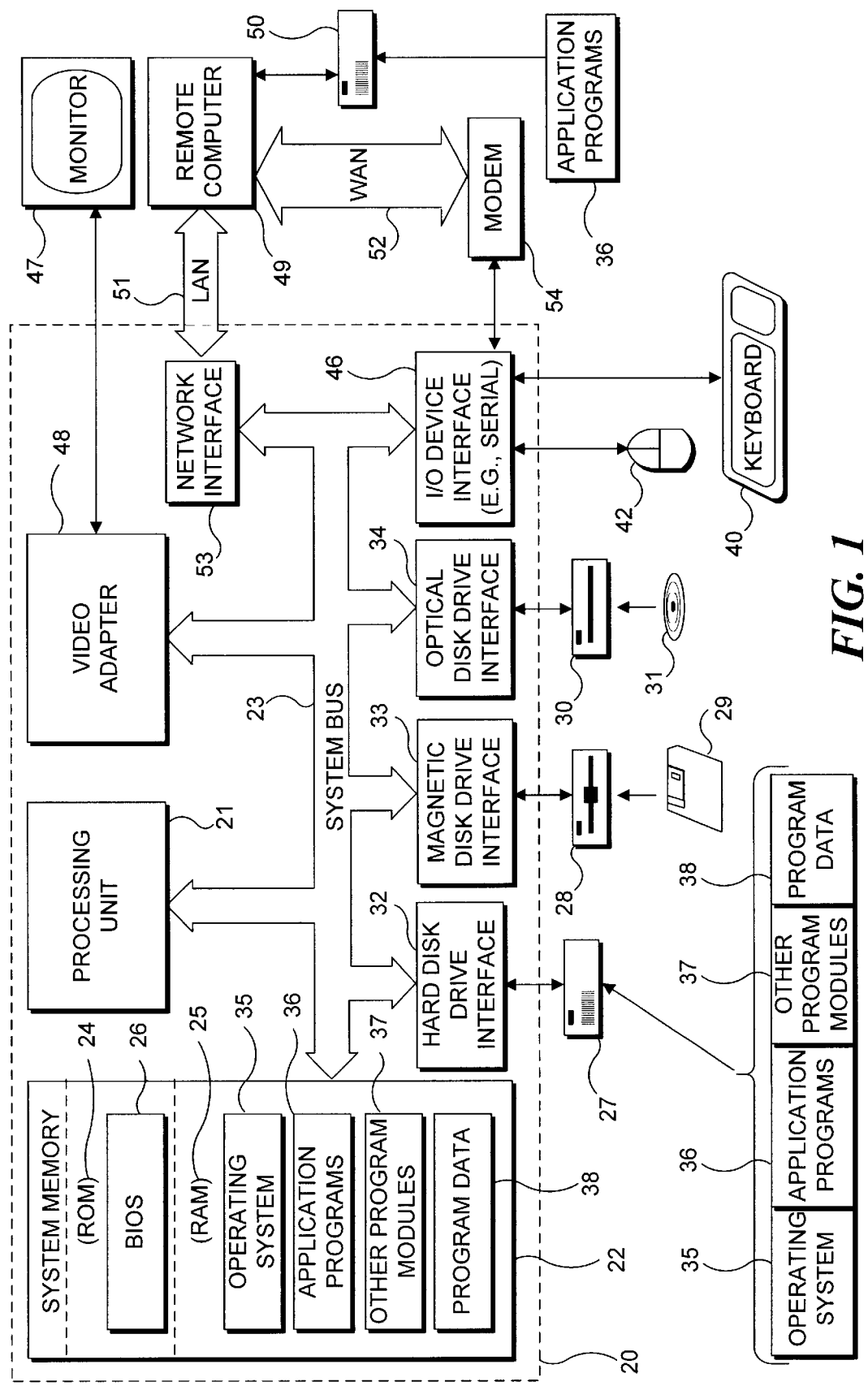
FIG. 1 is a schematic block diagram of an exemplary computing environment suitable for implementing the present invention.

FIG. 1 and the following discussion are intended to provide a brief, general description of a suitable computing environment in which software implementing the present invention may be implemented. Although not required, the present invention will be described in the general context of computer executable instructions, such as program modules, which are executed by a personal computer (PC) or a gaming console. Generally, program modules include application programs, such as computer simulations, routines, objects, components, functions, data structures, etc. that perform particular tasks or implement particular abstract data types. In addition, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a compact disc-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, digital versatile discs (DVDs), Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment in which the present invention is implemented, and/or other information. In addition to the monitor, PCs are often coupled to other peripheral output devices (not shown), such as speakers (through a sound card or other audio interface (not shown)), and printers.

In a networked environment, PC 20 can be logically connected to one or more other computers, such as a remote computer 49. Remote computer 49 may be another PC, a server, a router, a network PC, a peer device, a satellite, or other common network node comprising a client computer. Remote computer 49 also be a game console, like that described in greater detail below, and may include many or all of the elements described above in connection with PC 20, or may include typical elements of other electronic computing devices.

So as not to make FIG. 1 unnecessarily complex, remote computer 49 is shown with only an external memory storage device 50. The logical connections depicted in FIG. 1 include a local area network (LAN) 51 and a wide area network (WAN) 52, which may encompass the Internet. Such networking environments are common in offices, enterprise wide computer networks, intranets, and in regard to computing devices coupled to the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication between remote computing devices is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Gaming System

Figure 2:
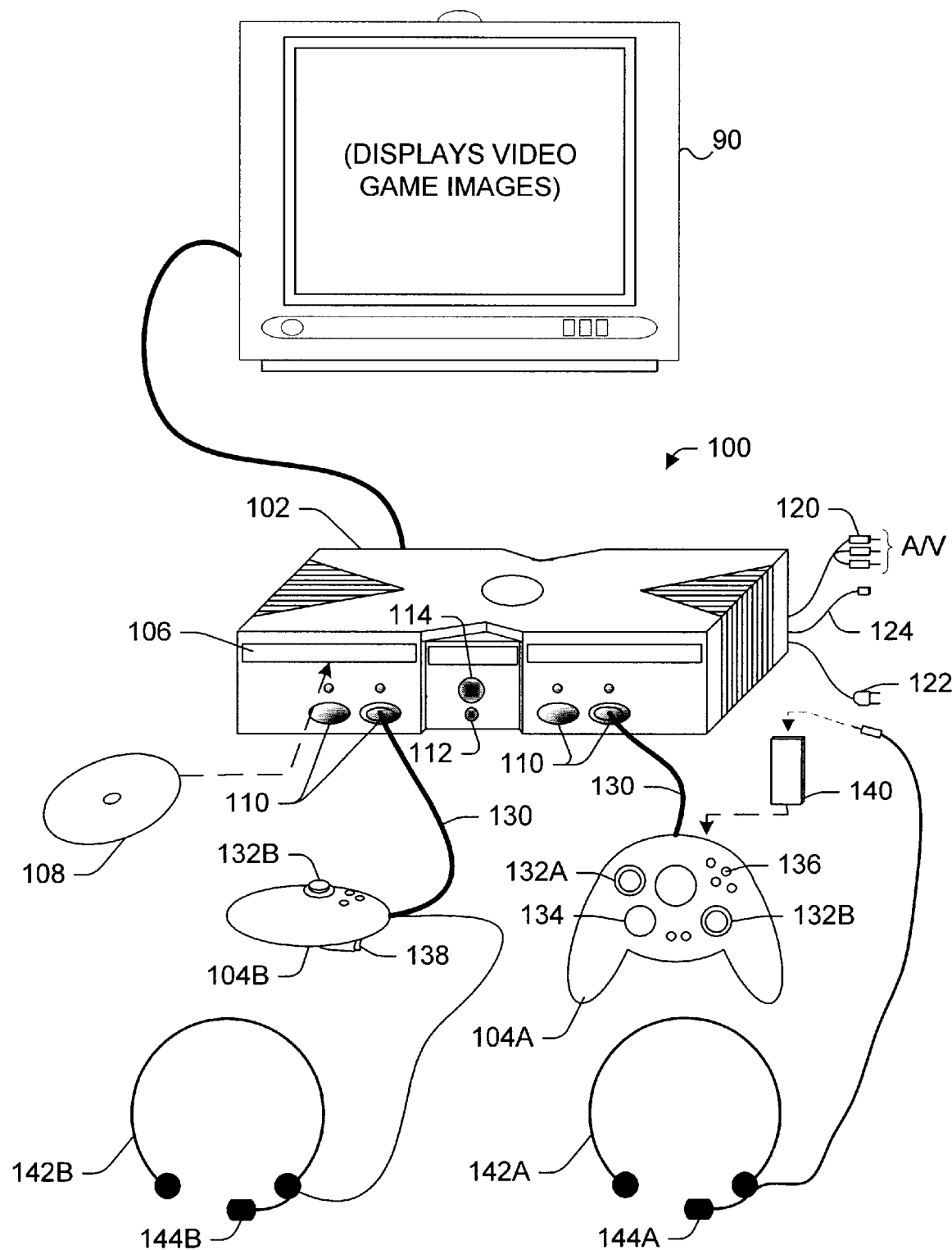
FIG. 2 is an isometric view of an exemplary client electronic gaming system that includes a game console and support for up to four user input devices.

FIG. 2 illustrates an exemplary electronic gaming system 100, which includes a game console 102 and support for up to four user input devices, such as controllers 104*a* and 104*b*. Of course game consoles supporting only a single user input device, or additional user input devices, can also be employed. Game console 102 is equipped with an internal hard disk drive (not shown) and includes a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of clients in connection with the present invention.

On a front face of game console 102 are four ports 110 for connection to supported controllers, although the number and arrangement of these ports may be modified. A power button 112, and an eject button 114 are also disposed on the front face of game console 102. Power button 112 controls application of electrical power to the game console, and eject button 114 alternately opens and closes a tray (not shown) of portable media drive 106 to enable insertion and extraction of storage disc 108, so that the digital data on the disc can be read for use by the game console.

Game console 102 connects to a television 90 or other display monitor or screen via audio/visual (A/V) interface cables 120. A power cable plug 122 conveys electrical power to the game console when connected to a conventional alternating current line source (not shown). Game console 102 includes an Ethernet data connector 124 to transfer and receive data over a network (e.g., through a peer-to-peer link to another game console or through a connection to a hub or a switch (not shown)), or over the Internet, for example, through a connection to an xDSL interface, a cable modem, or other broadband interface (not shown). Other types of game consoles may be coupled together in communication using a conventional telephone modem.

Each controller 104*a* and 104*b* is coupled to game console 102 via a lead (or alternatively, through a wireless interface). In the illustrated implementation, the controllers are universal serial port (USB) compatible and are connected to game console 102 via USB cables 130. Game console 102 may be equipped with any of a wide variety of user devices for interacting with and controlling the game software. As illustrated in FIG. 2, each controller 104*a* and 104*b* is equipped with two thumbsticks 132*a* and 132*b*, a D-pad 134, buttons 136, and two triggers 138. These controllers are merely representative, and other gaming input and control devices may be substituted for or added to those shown in FIG. 2 for use with game console 102.

A removable function unit 140 can optionally be inserted into controller 104 to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from the MU. For example, gaming system 100 is capable of playing:

Game titles stored on CD and DVD discs, on the hard disk drive, or downloaded from an online source;

Digital music stored on a CD in portable media drive 106, in a file on the hard disk drive (e.g., WINDOWS MEDIA AUDIO™ (WMA) format), or derived from online streaming sources on the Internet or other network; and Digital AV data such as movies that are stored on a DVD disc in portable media drive 106, or in a file on the hard disk drive (e.g., in an Active Streaming Format), or from online streaming sources on the Internet or other network.

Exemplary Illustration of a Sky Box with Dynamic Lighting

To enable a reader to better understand the present invention, it should be helpful to illustrate how the invention is used to create dynamically changing lighting for an exemplary sky box. Accordingly, in FIG. 3, a gray scale texture or luminance-only texture 200 is illustrated that is suitable for use in carrying out the present invention. Typically, an artist will manually prepare a full color background for a virtual environment, such as those used in an electronic game with the aid of a conventional graphic art application, such as Microsoft Corporation's PAINT-BRUSH™ program. It will be understood that graphic art applications are available from other sources that can also be used for preparing a graphic image suitable for use as a background or sky box in a virtual environment. As an alternative, the background for a virtual environment can be captured using one or more digital cameras to produce images of a scene that is either artificially created, or which exists at an actual site. Further, the background need not be developed for all directions around a viewpoint, if the application for which the sky box is to be used limits the viewpoint to less than all directions. Traditionally, the background for a virtual environment is developed for each side of a six-sided cube surrounding a viewpoint in the virtual environment. This approach has led to the term "sky box" being used for the background, since the background is represented by the internal images applied to six sides of such a cube surrounding a viewpoint. However, the background can instead be represented as an image on the inner surface of a sphere surrounding the viewpoint within the virtual environment. Again, if the application does not require that a background be provided for the entire inner surface of a sphere surrounding the viewpoint, it may be necessary to develop the background image for only a portion of the inner surface of the sphere.

In most applications, the background on one side of a cube can be replicated for the other sides of the cube, since there will typically not be any specific landmark in the background, which would appear strange if replicated in each of the four sides of the cube. For example, if the background includes mountains that are in the distance, it would not be unusual for similar mountains to surround the viewpoint on all four sides. But, if the background includes a predominant peak or other distinctive landmark on one side, it would be unrealistic to include the same distinctive landmark on all four sides. Also, since the background is often hidden by haze, details of the background are generally not critical, and the lack of such details do not cause an observer to conclude that the background is any less realistic because it does not include such details.

Since haze often obscures the background, the lighting conditions applied to the background can generally be uniform, even where the same light color extends across portions of the sky and portions of the background such as mountains. An observer would generally expect that the haze in front of mountains would cause a purple sky in the background to cause the mountains to appear purple also. Since the background is not normally the subject of close observation by a player in a game, the player's concentration on action that is in the foreground makes details in the background much less important.

Figure 3:
FIG. 3 is an exemplary luminance-only sky box texture image.

Once the background for the virtual environment has been created, the chrominance data is removed from the background, leaving the luminance-only texture as shown in the example of FIG. 3. Next, an illustrator will prepare a color texture table for a location within the virtual environment. In a game, it is possible that a number of scenes at different locations will be required, and an appropriate background image and color texture table will be required for each different scene. The color texture table has an axis along which is depicted the color applied to pixels of the background relative to one dimension of the background, and an axis along which the colors applied to the background along that one dimension of the background change as a function of a specified parameter. Typically, the parameter will be time, as shown in an exemplary color texture table 202 in FIG. 4. In this exemplary color texture table, it is assumed that the color texture that will applied to the sky box in a direction corresponding to altitude varies dynamically with the passage of time (along the horizontal axis of the color texture table), during a predefined period. For example, the period could be an entire 24-hour day, so that the color texture table includes color textures that change dynamically over the time from full darkness during the very early morning, through sunrise, midday, sunset, and full darkness late at night. However, the time period might only be for a specified number of hours during the day or during the night. Also, other parameters beside time can be used to control the color texture data applied to the sky box. For example, the color texture table could include a plurality of different color textures corresponding to different weather conditions in the background, including very overcast, stormy conditions, bright sunny sky conditions, partially cloudy conditions, etc.

Figure 4:
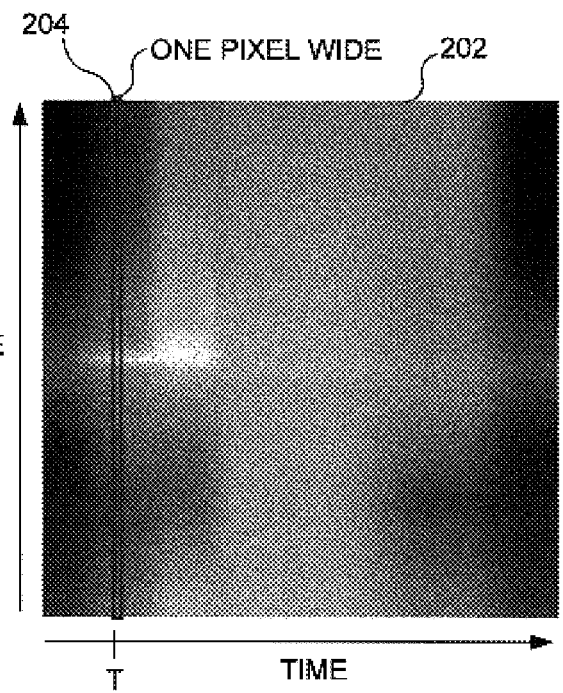
FIG. 4 (color) is an exemplary color texture for use with the luminance-only sky box texture image of FIG. 3, in accord with the present invention.
Figure 5:
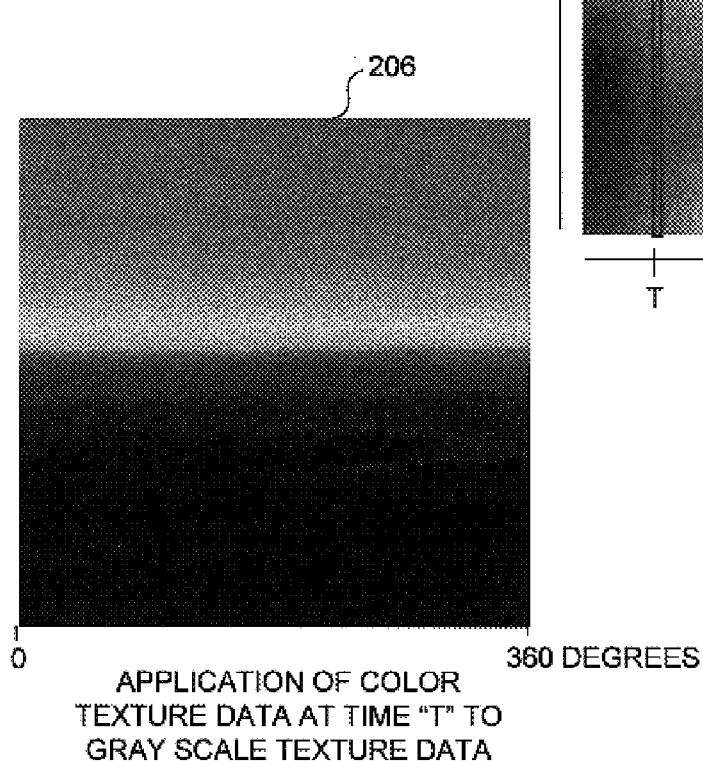
FIG. 5 (color) is a resulting sky box lighting using a selected column within the color lookup texture of FIG. 4, applied to the luminance-only sky box texture image of FIG. 3.

In regard to FIG. 4, substantially greater resolution in the color texture applied at a given time of the day is provided than may be necessary. In some instances, the number of variations in the color texture as a function of the parameter can be relatively few in number. However, in the example of FIG. 4, the color texture applied to dynamically vary the sky box lighting is resolved to a column 204 that is only one pixel wide. Column 204 changes with the value of the parameter, which in FIG. 4 is the time "T" in the virtual environment. Thus, at a time T, column 204 indicates the color values that are applied to the pixels as a function of altitude to luminance-only texture 200 in FIG. 3. Sky box lighting 206 in FIG. 5 is the result of applying the color values in column 204 at time T to luminance-only texture 200 in FIG. 3.

It will be apparent that in the example shown for this embodiment, the color at each successively higher altitude in color texture table 202 extends horizontally across the corresponding gray scale luminance-only texture. However, application of the same color to portions of the sky and the mountains does not cause the background to be unrealistic, since this effect is often observed in nature due to haze in the distant background. Indeed, the relatively low resolution required for a virtual environment background lends itself to this technique for dynamically varying the color applied to the sky box as a function of a parameter such as time. Since an observer in a game tends to be viewing the background over only a portion of its full extent, use of a sunrise color that extends in a band 360 degrees, completely around the horizon, compared to a more realistic sunrise that is limited to only a portion of the horizon on the East side of the sky box will not be viewed as unrealistic to the observer. Moreover, another embodiment of the present invention addresses this issue, as explained below. Also, for greater realism, other objects (e.g., moving sprites) can be superimposed over the background, such as clouds, aircraft, birds, etc., to provide a more realistic impression of a virtual environment.

Figure 6:
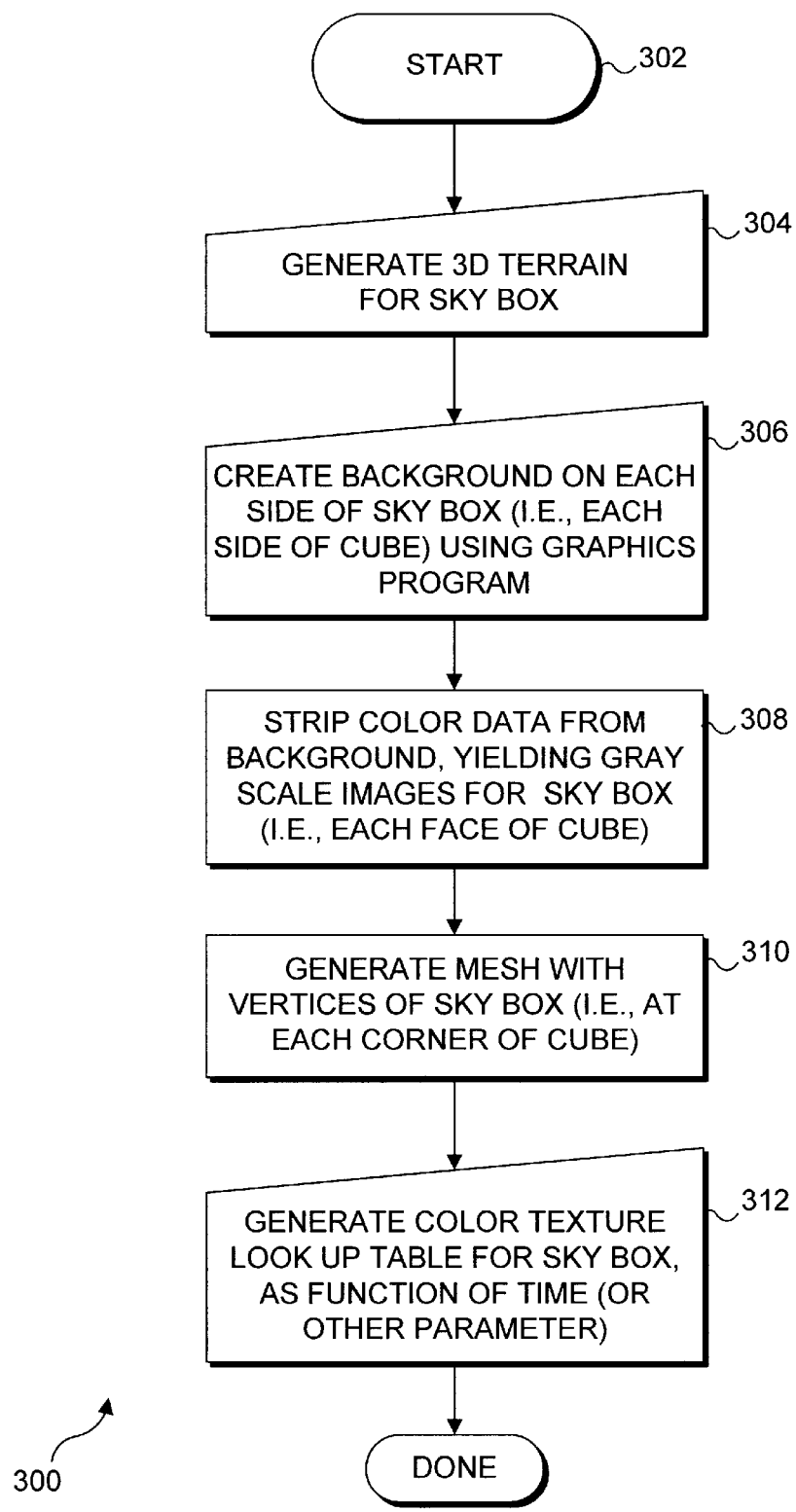
FIG. 6 is a flow chart showing the logical steps implemented to create a luminance-only sky box texture and corresponding color texture, for use in accord with the present invention.

In FIG. 6, a flow chart 300 illustrates the steps employed to produce the gray scale or luminance-only texture, and the color texture lookup table for use with the present invention. From a start block 302, the logic proceeds to generating a 3D terrain for the sky box in a step 304. As noted above, this step involves an artist using appropriate tools for generating the 3D terrain image for the background of the virtual environment, whether for a virtual environment on the earth, or in some other location, such as outer space. In a step 306, using such a tool, the artist creates a background for each side of a sky box cube. Alternatively, the artist may produce a spherical background, as noted above. In a step 308, using a suitable computer graphics program, the color data are stripped from the background image, yielding the luminance-only texture for each side of the sky box or each face of the cube surrounding an observer viewpoint. The luminance-only texture data represent the original in shades of gray, without any chrominance information.

Next, in a step 310, the user generates a mesh having vertices of the sky box. For example, the vertices for the corners of the sky box cube may be included in the mesh to provide a reference for the different sides of the sky box when rendering the sky box in the virtual environment. Finally, in a step 312, the color texture lookup table data are generated for the sky box wherein the different colors applied along an axis, such as in regard to the altitude of the background image, vary as a function of a selected parameter., e.g., time. In non-terrestrial virtual environments, it may be preferable to have color vary as a function of angular displacement around the observer, resulting in color bands that extend vertically in contrast to the examples shown in FIGS. 4 and 5, where the color bands extend horizontally. In most terrestrial backgrounds, the color bands will extend horizontally, and different colors will be arranged as a function of altitude (i.e., vertical position) in columns that are selected as a function of the value of the predefined parameter.

Once the gray scale texture and color texture data have been developed as described above, they are made available within a virtual environment application program such as a game so that the sky box lighting changes dynamically as a function of the value of the selected parameter.

Figure 7:
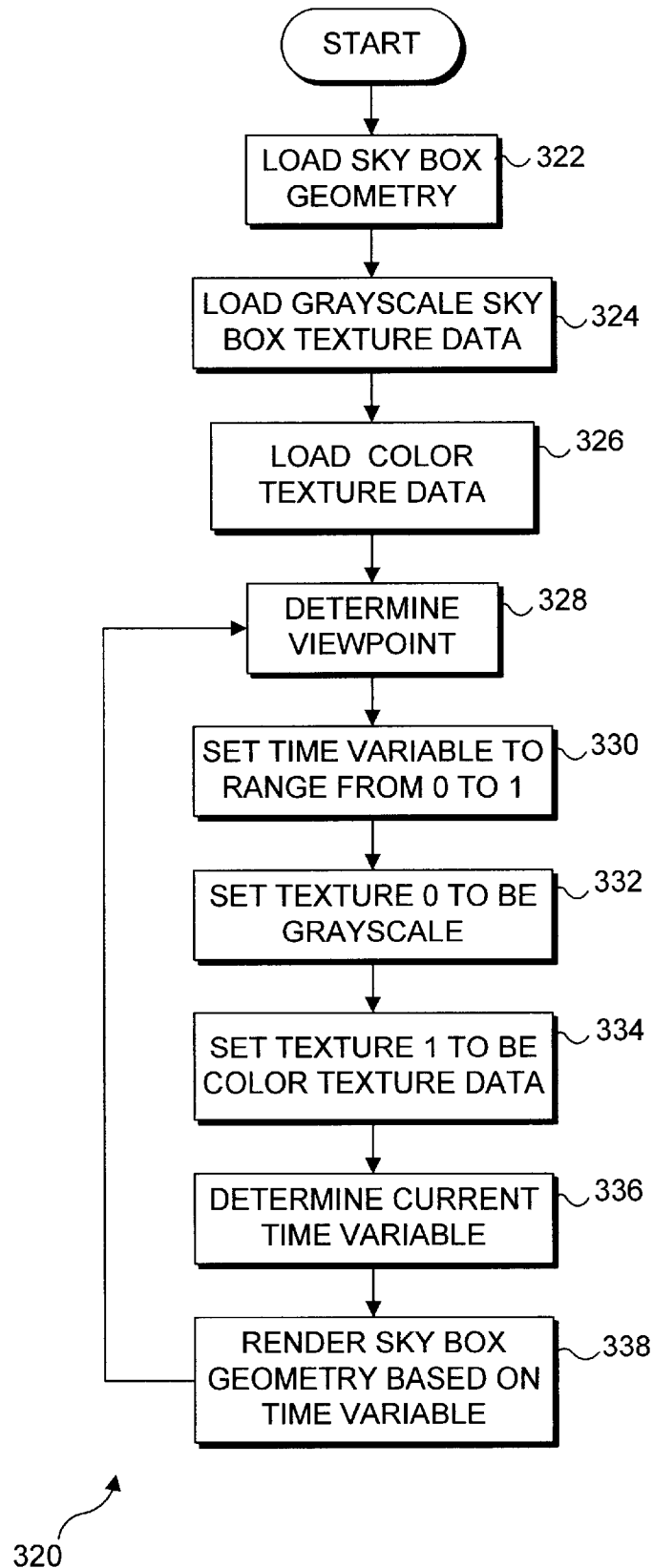
FIG. 7 is a flow chart showing the logical steps implemented to dynamically vary the sky box lighting in response to a variable.

FIG. 7 illustrates a flow chart 320 in which the steps applied for using the gray scale texture and color texture data in accordance with the present invention are illustrated. After the start box, a step 322 provides for loading the sky box geometry, e.g., as defined by the vertices of the cube corners. Next, a step 324 loads the gray scale or luminance-only texture data that were created as described above. In a step 326, the color texture data that will be used for applying chrominance values to the luminance-only texture are loaded.

To determine the side or sides of the sky box that will be visible to the observer in a virtual environment, a step 328 determines the viewpoint of the observer. Furthermore, to determine the portion of the color texture data that will be used, a variable must be set and normalized to range from a value of zero to one, as indicated in a step 330. A step 332 provides for setting texture 0 to be equal to the gray scale or luminance-only texture data that were loaded in step 324. Similarly, in step 334, texture 1 is set equal to the color texture data loaded in step 326. In a step 336, the program determines the current value for time or the value of the another variable that will determine the specific portion of the color texture data that will be applied to the luminance-only texture. Finally, in a step 338, the program renders the sky box geometry based on the time or other variable that was selected in step 336, using the corresponding color texture data for that time. The result is dynamically variable sky box lighting for the virtual environment, for example, like that shown in FIG. 5.

Figure 8:
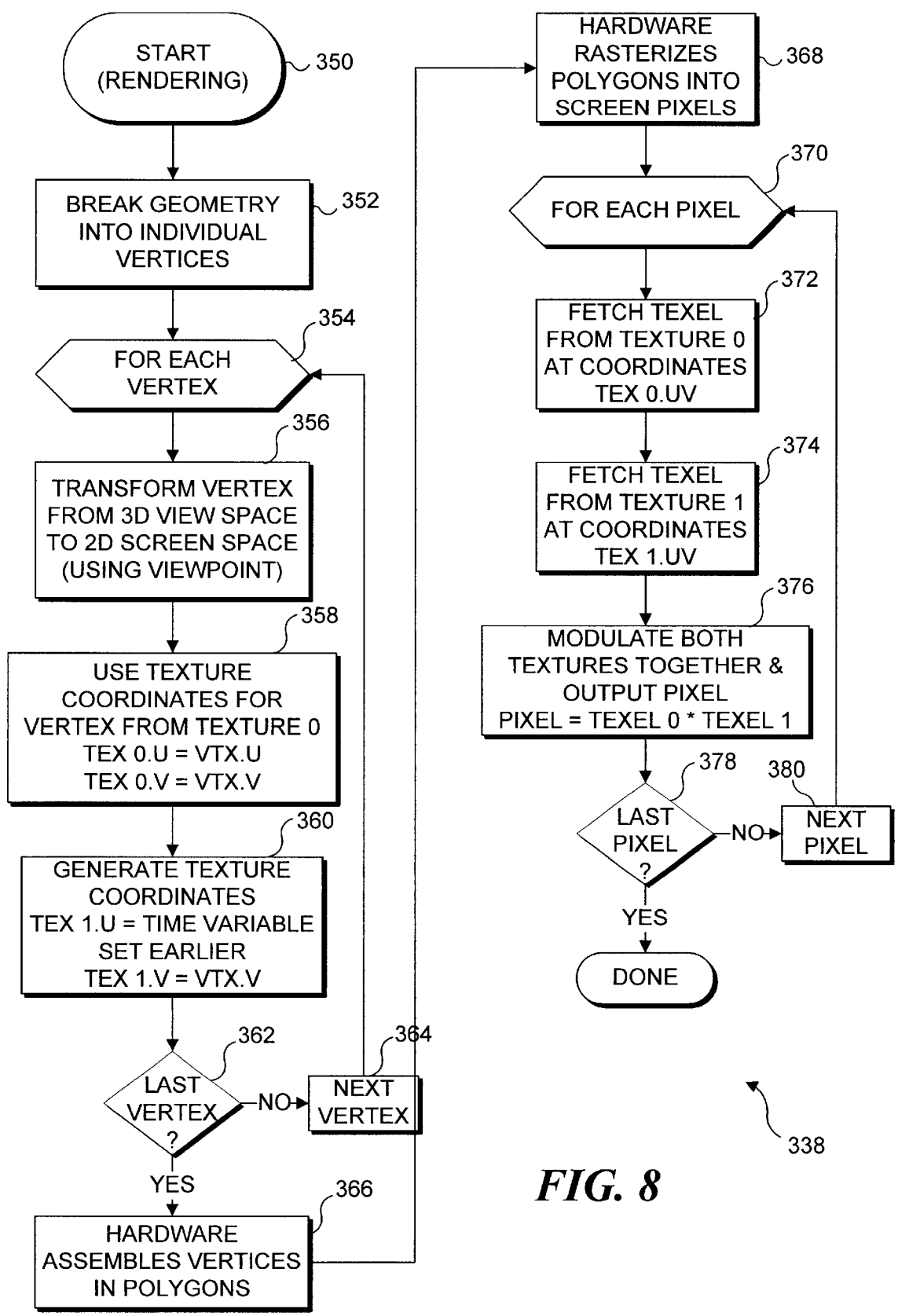
FIG. 8 is a flow chart showing the logic for rendering the sky box geometry, in accord with the present invention.

Details of step 338 are illustrated in FIG. 8. Following a start box 350 for the rendering process, a step 352 provides for breaking the geometry into individual vertices. In this step, the surfaces of the cubes are delineated based upon the location of the corner vertices of the cube, in regard to the luminance-only texture. In a step 354, for each vertex, steps 356, 358, 360, 362, and 364 are carried out, until all vertices have been processed. In step 356, the program transforms a current vertex from 3D view space into 2D screen space relative to the viewpoint of the observer. Next, step 358 uses the texture coordinates for the current vertex from texture zero (the luminance-only texture), setting the variable TEX 0.U=to VTX.U and TEX 0.V=to VTX.V. A step 360 generates the texture coordinates as a function of the variable that was set earlier. In this case, it is assumed that the variable is time, so TEX 1.U equals the time variable set earlier and TEX 1.V equals VTX.V. A decision step 362 determines if the last vertex has been processed, and if not, a step 364 moves to the next vertex, enabling the process to loop back to step 354.

Once all of the vertices have been processed by setting up the luminance-only texture data for the vertices, the logic proceeds to a step 366, wherein the hardware (e.g., a video adapter card—not shown) assembles the vertices into polygons. A step 368 provides for using the hardware to rasterize the polygons into screen pixels for use in displaying the background on a display monitor.

As indicated in a block 370, steps 372, 374, 376, 378, and 380 are carried out for each pixel in the display. Step 372 provides for fetching a texel from texture 0 (the gray scale texture) at coordinates TEX 0.UV. A "texel" is the smallest addressable unit of a texture map. In the examples shown in FIGS. 3–5, each texel corresponds to a pixel. However, it is also contemplated that in many instances, less resolution will be required for the color texture so that a texel may correspond to a group of pixels in the display.

Step 374 fetches the texel from texture 1 (the color texture) at coordinates TEX 1.UV so that the texels from texture 0 correspond to those from texture 1. Step 376 then modulates the textures together to produce an output pixel equal to a product of texel 0 and texel 1. Decision step 378 determines if the last pixel in the display being rendered has been processed, and if not, the logic proceeds to a step 380 to process the next pixel. After all pixels have been processed, the logic required for rendering the sky box is completed.

3D Texture Map Embodiment

Figure 9:
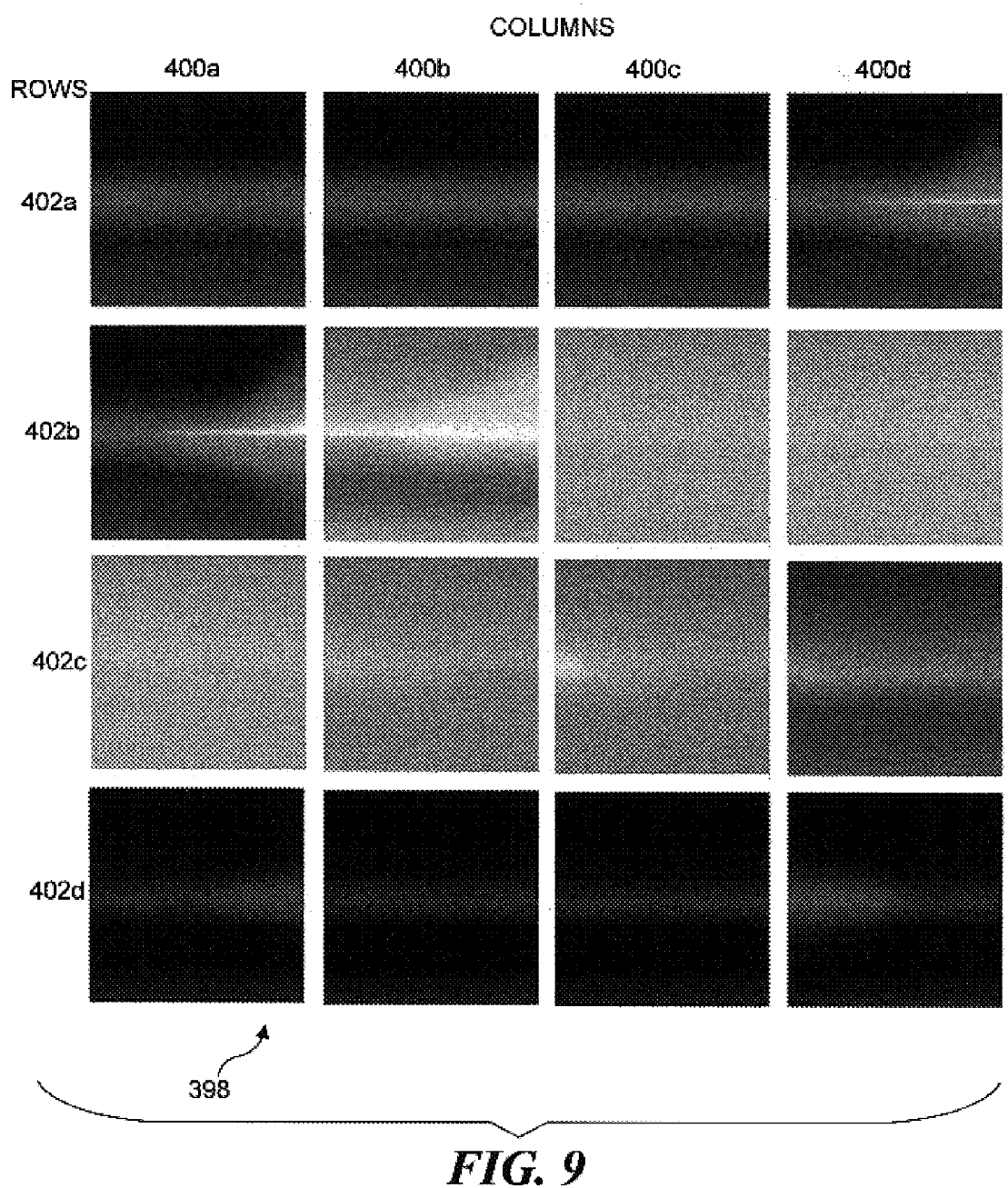
FIG. 9 (color) is an array of a portion of a plurality of 2D time of day color textures for use with a luminance-only sky box texture to produce sky box lighting that varies in 3D aspect and changes based upon the time of day.

FIG. 9 illustrates a plurality of color textures that are used for a different embodiment of the present invention in which the color applied to the luminance-only texture can differ two-dimensionally within the image as well as in response to the value of a parameter such as time. Color textures 398 represent only a few of the color textures that might be used for a particular sky box of this type, which are arranged in columns 400a, 400b, 400c, and 400d and in rows 402a, 402b, 402c, and 402d. By displaying the color textures in this manner, it is easy to see the differences between them.

Figure 10:
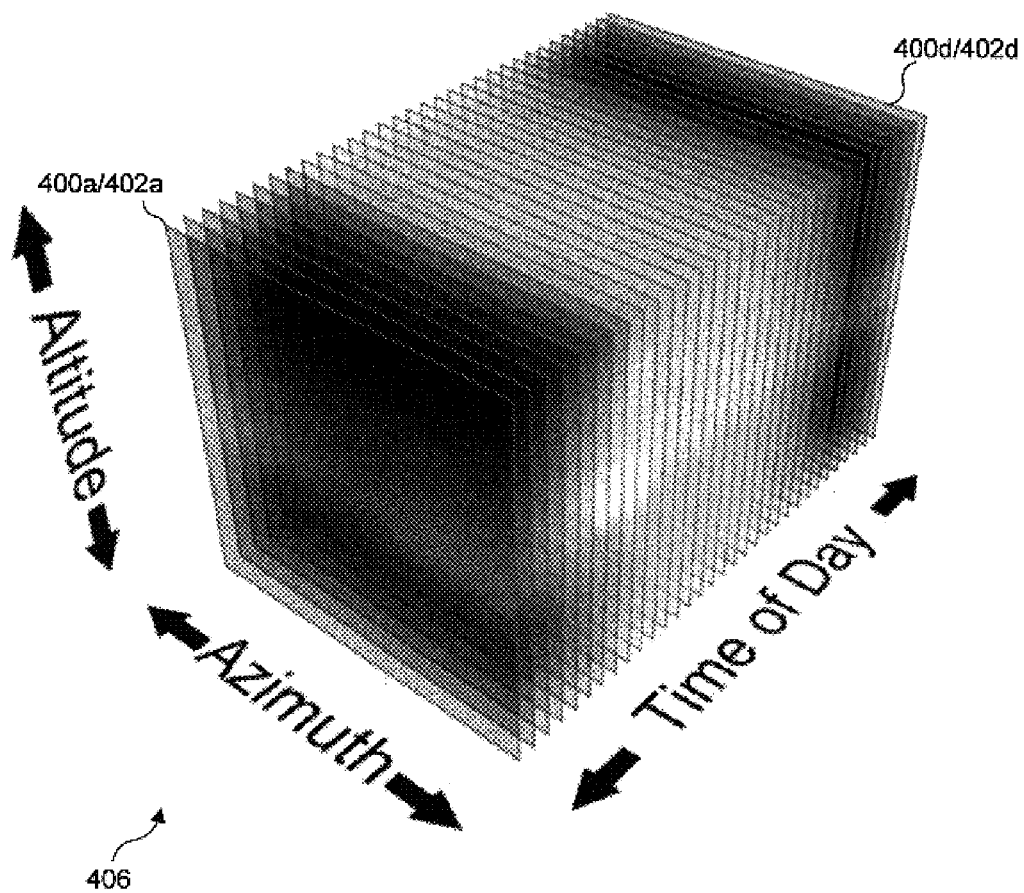
FIG. 10 (color) is a more complete set of the 2D time of day color textures, illustrated in 3D aspect to show how each axis of the color textures are mapped.

In FIG. 10, more of the color textures are illustrated in a stacked array 406 showing the relationship of the color textures in 3D. The dimensions in FIG. 10 include altitude, azimuth, and time of day (or another parameter). Thus, in this embodiment, instead of selecting a single column of pixels corresponding to a parameter such as the time of day, a different color texture from the stack 406 is selected as a function of the value of the time of day or other parameter. Furthermore, as shown in FIG. 9, the color textures differ at different times of the day, for example, to show a sunrise at row 402a column 400d, and row 402b column 400a. Similarly, a sunset is most evident at a row 402c column 400c. This embodiment addresses the problem noted above, wherein changes in lighting that are unrealistic, because they extend completely around the observer instead of being disposed at an expected azimuth location. Using the present embodiment, sky box lighting can be more realistically portrayed.

Figure 11:
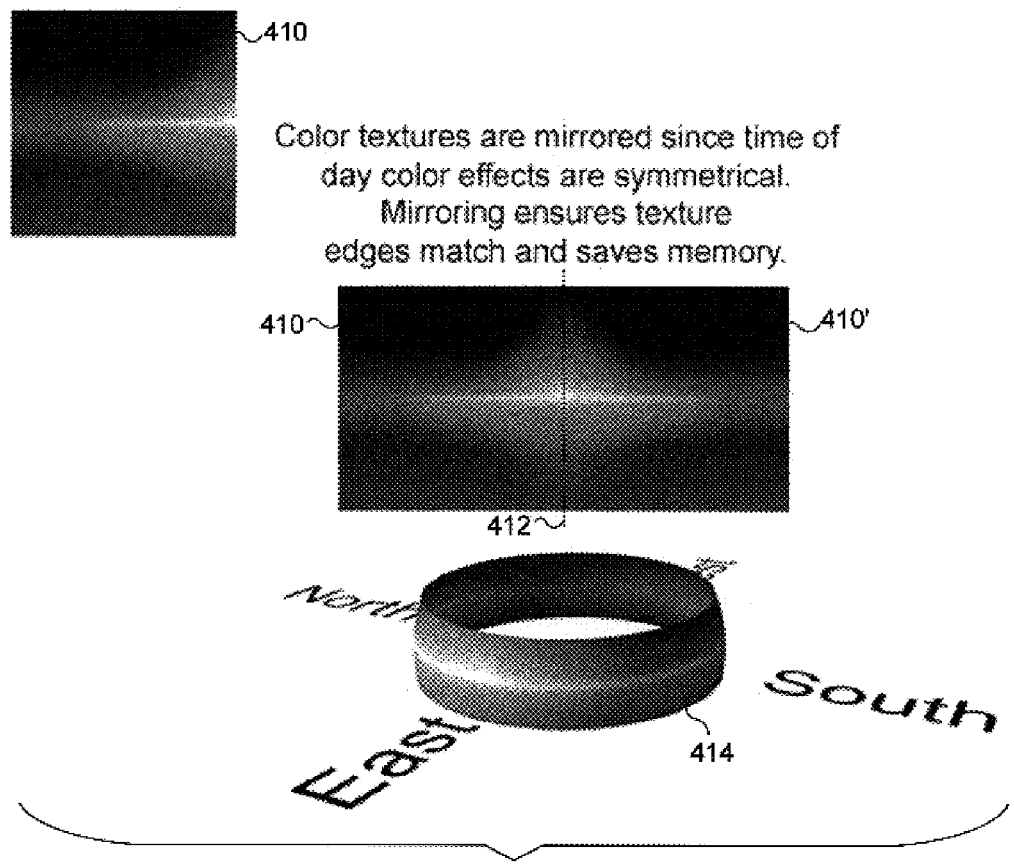
FIG. 11 (color) illustrates how a 2D color texture is mirrored and stretches around a horizon.

FIG. 11 provides an example wherein the color texture 410 (corresponding to color texture at row 402b, column 400a in FIG. 9) is mirrored, producing a color texture 410'. Since time of day color effects are generally symmetrical about a center line 412, mirroring the color textures in this way ensures that the edges match while saving memory, since only color texture 410 needs to be saved in memory. In the example shown in FIG. 11, a selected color texture (at sunrise) is rendered with the luminance-only texture data providing a ring 414 that extends around a viewpoint (not shown) in the virtual environment. Thus, in this example, the color is not uniform along bands that extend horizontally. Instead, the observer sees the sunrise in the east as would be expected rather than extending a full 360 degrees around the observer.

It will be understood that parameters other than time can be applied in this embodiment so that a corresponding color texture can be used to represent each different value of the parameter. For example, different color textures could be employed to represent various stages of a forest fire or other occurrence visible in the background in a virtual environment. Similarly, different conditions of weather can be represented with color textures. Thus, one color texture may include a lightening flash that is visible in a certain portion of the virtual environment background relative to azimuth and altitude. The present embodiment thus provides considerably more versatility and enables the background to be depicted in a more realistic manner than the first embodiment.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for creating a background for display in a virtual environment, where the background is dynamically variable, comprising the steps of:
   (a) providing:
      (i) geometry data that define the background;
      (ii) gray scale texture data for the background;
      (iii) color texture data for the background, said color texture data defining chrominance values that vary as a function of a predefined parameter;
   (b) supplying a value for the predefined parameter, said value dynamically changing;
   (c) using the value supplied for the predefined parameter to determine chrominance values from the color texture data for pixels comprising the background, where specific pixels correspond to specific portions of the color texture data;
   (d) modulating the gray scale texture data for successive pixels with the chrominance values determined for the pixels; and
   (e) using results from the step of modulating, successively rendering the background in the virtual environment, so that the background dynamically changes as a function of the value for the predefined parameter.

2. The method of claim 1, wherein the color texture data comprise a color texture lookup table having a first axis along which the value of the predefined variable varies, and a second axis that is orthogonal to the first axis and along which the chrominance values define the colors of pixels extending across one dimension of the background.

3. The method of claim 1, further comprising the step of determining a viewpoint within the virtual environment to determine a portion of the background to display.

4. The method of claim 1, wherein the step of providing the gray scale texture data comprises the step of stripping out chrominance components from an image depicting the background, producing the gray scale texture data.

5. The method of claim 1, wherein the predefined parameter comprises time, and wherein the step of supplying the value for the predefined parameter comprises the step of indicating the time varying during a time interval.

6. The method of claim 1, wherein the color texture data define bands of color in the background, where said bands of color change as a function of the value of the predefined parameter.

7. The method of claim 1, wherein the color texture data comprise a plurality of color texture lookup tables, each color texture lookup table corresponding to a different value of the predefined parameter, further comprising the step of applying the chrominance values defined along one axis of each of the color texture lookup tables to corresponding pixels in the gray scale texture data as a function of an angular disposition of the pixels within the virtual environment, so that the chrominance values applied to each pixel are determined as a function of three-dimensional coordinates associated with each pixel, said three-dimensional coordinates including a value for the predefined parameter that determines the color texture lookup table that will be used and a disposition of the pixel relative to orthogonal axes in the gray scale texture data and in the color texture lookup table that is currently being used.

8. A memory medium having machine instructions stored thereon for carrying out the steps of claim 1.

9. A method for displaying a background in a virtual environment so that the background varies dynamically as a function of time, comprising the steps of:
   (a) providing:
      (i) geometry data that define the background;
      (ii) gray scale texture data for the background;
      (iii) color texture data for the background, said color texture data defining chrominance values that vary as a function of time in the virtual environment;
   (b) as time passes in the virtual environment, determining corresponding chrominance values from the color texture data, for pixels comprising the background in the virtual environment;
   (c) multiplying the gray scale texture data by the chrominance values to determine data defining pixels in the background; and
   (d) using data for the pixels for rendering the background in the virtual environment, so that the background dynamically changes as time passes in the virtual environment.

10. The method of claim 9, wherein the color texture data comprise a color texture lookup table having a first axis that varies with the passing of time in the virtual environment, and a second axis that is orthogonal to the first axis and along which the chrominance values define the color of pixels in one of rows and columns within the background.

11. The method of claim 9, further comprising the step of determining a portion of the background being viewed in the virtual environment, so that said portion is rendered for viewing.

12. The method of claim 9, wherein the step of providing the gray scale texture data comprises the step of stripping away chrominance components from an image depicting the background, producing the gray scale texture data.

13. A memory medium having machine instructions stored thereon for carrying out the steps of claim 9.

14. A system for providing a background for a virtual environment, where the background is dynamically varied as a function of a predefined parameter, comprising:
 (a) a display;
 (b) a memory in which are stored:
  (i) a plurality of machine instructions;
  (ii) gray scale texture data for the background; and
  (iii) color texture data for the background, said color texture data defining chrominance values that vary as a function of the predefined parameter; and
 (c) a processor coupled to the memory and to the display, said processor executing the machine instructions to carry out a plurality of functions, including:
  (i) using the value for the predefined parameter, determining chrominance values from the color texture data, for corresponding pixels comprising the background;
  (ii) modulating the gray scale texture data for pixels with the chrominance values corresponding to the pixels; and
  (iii) using results from the step of modulating, successively rendering the background in the virtual environment on the display as the value of the predefined parameter changes, so that the background dynamically changes as a function of the value of the predefined parameter.

15. The system of claim 14, wherein the color texture data comprise a color texture lookup table having a first axis that varies with the value of the predefined variable, and a second axis that is orthogonal to the first axis and along which the chrominance values define the colors of pixels comprising the background.

16. The system of claim 14, wherein the predefined parameter comprises time within the virtual environment, so that the chrominance values applied to the gray scale texture data change with passing time.

17. The system of claim 14, wherein the color texture data define bands of color in the background that change on the display as the value of the predefined parameter changes.

18. The system of claim 14, wherein the color texture data comprise a plurality of color texture lookup tables, each color texture lookup table corresponding to a different value of the predefined parameter, further comprising the step of applying the chrominance values defined along one axis of each of the color texture lookup tables to corresponding pixels in the gray scale texture data as a function of an angular disposition of the pixels within the virtual environment, so that the chrominance values applied to each pixel are determined as a function of three-dimensional coordinates associated with each pixel, said three-dimensional coordinates including a value for the predefined parameter that determines the color texture lookup table that will be used and a disposition of the pixel relative to orthogonal axes in the gray scale texture data and in the color texture lookup table that is currently being used.

19. A system for displaying a background in a virtual environment so that the background varies dynamically as a function of time, comprising:
 (a) a display;
 (b) a memory in which are stored;
  (i) a plurality of machine instructions;
  (ii) gray scale texture data for the background; and
  (iii) color texture data for the background, said color texture data defining chrominance values that vary as a function of time passing in the virtual environment; and
 (c) a processor coupled to the memory and to the display, said processor executing the machine instructions to carry out a plurality of functions, including:
  (i) as time passes in the virtual environment, determining corresponding chrominance values from the color texture data, for pixels extending across the background in the virtual environment;
  (ii) multiplying the gray scale texture data by the chrominance values to determine pixels in the background; and
  (iii) using the pixels for rendering the background in the virtual environment, so that the background dynamically changes on the display as time passes in the virtual environment.

20. The system of claim 19, wherein the color texture data comprise a color texture lookup table having a first axis that varies with time in the virtual environment, and a second axis that is orthogonal to the first axis and along which the chrominance values define the color of pixels in one of rows and columns within the background.

21. The system of claim 19, wherein the machine instructions further cause the processor to determine a portion of the background being viewed in the virtual environment, so that said portion is rendered on the display for viewing.

* * * * *